(12) United States Patent
Kato

(10) Patent No.: US 6,907,784 B2
(45) Date of Patent: Jun. 21, 2005

(54) VIBRATION TYPE ANGULAR VELOCITY SENSOR

(75) Inventor: Kenji Kato, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/797,097

(22) Filed: Mar. 11, 2004

(65) Prior Publication Data

US 2004/0177690 A1 Sep. 16, 2004

(30) Foreign Application Priority Data

Mar. 13, 2003 (JP) ........................................ 2003-068089

(51) Int. Cl.$^7$ ............................................. G01P 15/00
(52) U.S. Cl. ................................................ 73/514.15
(58) Field of Search ....................... 73/504.02, 504.16, 73/514.02, 514, 15, 498

(56) References Cited

U.S. PATENT DOCUMENTS 4,671,112 A * 6/1987 Kimura et al.
5,987,987 A * 11/1999 Watarai et al.
6,282,957 B1 * 9/2001 Akimoto et al. .......... 73/504.12

FOREIGN PATENT DOCUMENTS

JP           60188809 A  *  9/1985  ........... G01C/19/56
JP       A-H03-156312      *  7/1991

* cited by examiner

Primary Examiner—Hezron Williams
Assistant Examiner—Tamiko Bellamy
(74) Attorney, Agent, or Firm—Posz Law Group, PLC

(57) ABSTRACT

An angular velocity sensor has an adjustment circuit for adjusting the amplitude of a detection signal generated corresponding to a displacement of each of arm portions vibrating in the X-axis direction. The adjusted signal is input as a comparison reference signal to operational amplifiers of amplifying circuits at the first stage. At this time, the comparison reference signal input to the non-inverting input terminals are applied by the operation(imaginary short-circuit) of the operational amplifiers, and act to offset the signal of an extraneous vibration component, so that an extraneous signal of the vibrator can be adjusted.

12 Claims, 3 Drawing Sheets

VIBRATION TYPE ANGULAR VELOCITY SENSOR

CROSS REFERENCE TO RELATED APPLICATION

This application is based on and incorporates herein by reference Japanese Patent Application No. 2003-68089 filed on Mar. 13, 2003.

FIELD OF THE INVENTION

The present invention relates to a vibration type angular velocity sensor for vibrating a vibrator in a driving axis direction by applying an AC voltage from a driving circuit to the vibrator and producing an angular velocity signal by detecting the signal corresponding to a displacement of the vibrator which occurs in a detection axis direction perpendicular to the driving axis direction.

BACKGROUND OF THE INVENTION

Vibration type angular velocity sensors are used to detect rotation, sidewise slipping, etc. of vehicles. For example, according to a vehicle stabilization control system or a four-wheel steering angle control system, sidewise slipping of a vehicle is detected on the basis of an angular velocity or the like detected by a vibration type angular velocity sensor to detect an abnormality state of the vehicle, and a brake is controlled on the basis of the detection result, so that the vehicle can travel safely.

According to vibration type angular velocity sensors, an AC voltage is applied from a driving circuit to a vibrator to drive the vibrator in a driving axis direction, the signal corresponding to a displacement of the vibrator occurring in a detection axis direction perpendicular to the driving axis direction is detected, and an angular velocity signal is produced on the basis of the signal corresponding to the detected displacement.

The velocity of an object having a mass M in the X-axis direction is represented by v-vector, the direction perpendicular to the v-direction is set as the Y-axis direction and the direction perpendicular to both the X-axis and the Y-axis is set as the Z-axis. When an angular velocity $\Omega$ is generated around the Z-axis, Coriolis force $2 \cdot M \cdot (\Omega \times v)$ acts on the object in the Y-axis direction. Here, $\Omega$ represents the vector in the Z axis direction and "×" represents outer product. Therefore, a displacement occurs in the detection axis (Y-axis) because the vibrator is vibrated in the driving axis (X-axis) direction, the signal corresponding to the displacement occurring in the vibrator in the detection axis (Y-axis) direction is produced, and finally an angular velocity signal is produced on the basis of the signal corresponding to the displacement of the vibrator.

The signal component of Coriolis force is proportional to the velocity v of the object. Therefore, when the vibrator is vibrated at a predetermined frequency, the signal component appears as a component whose phase is shifted from the displacement in the driving axis direction of the vibrator by 90 degrees like it vibrates in the detection axis direction.

It has been found in this kind of vibration type angular velocity sensor that even when no angular velocity $\Omega$ is applied around the Z-axis, an extraneous or unnecessary vibration component appears in the detection axis direction due to an effect such as a mechanical dimensional error or the like of the vibrator. This extraneous vibration component is varied by external disturbance such as temperature or the like, and thus the vibrator is generally adjusted so as to reduce the extraneous vibration. If no adjustment is made, the travel characteristic of the vehicle in the above system is controlled remarkably unstably, and this is not desirable.

Therefore, U.S. Pat. No. 5,987,987 No. (JP-A-11-351874) discloses a method of adjusting extraneous vibration of the vibrator of a vibration type angular velocity sensor. According to this adjustment method, extraneous vibration occurring in the detection axis direction of the vibrator can be reduced by mechanically trimming the ridge line of the base portion of the vibrator as shown in FIG. 5.

However, the method of mechanically trimming the ridge line of the base portion of the vibrator needs a trimmer for trimming the vibrator and a suction device for sucking trimmed-out dust absorbed in the sensor main body on the vibrator in the adjustment work. Furthermore, if an adjustment error occurs due to excessive trimming of the vibrator, it is difficult to re-adjust the extraneous vibration. In addition, trimming of the vibrator may apply a mechanical damage to the vibrator.

SUMMARY OF THE INVENTION

The present invention has been implemented in view of the foregoing situation, and has an object to provide a vibration type angular velocity sensor which needs neither a trimmer nor a suction device in the adjustment work, can make re-adjustment and also applies no mechanical damage to a vibrator.

In order to attain the above object, according to the present invention, a first detection circuit produces a signal corresponding to a displacement of a vibrator in the direction of the driving axis driven by a driving circuit, and a second detection circuit produces a signal corresponding to a vibration displacement occurring in the detection axis direction by an amplifying circuit. An adjustment circuit adjusts the amplitude of the signal corresponding to the displacement in the driving axis direction detected by the first detection circuit in the same phase or reverse phase, and supplies the signal thus adjusted as a comparison reference signal to the amplifying circuit at the first stage of the second detection circuit.

A signal component of Coriolis force acts in the detection axis direction as a component whose phase is shifted from the displacement in the driving axis direction of the vibrator by 90 degrees. An extraneous vibration component has the same phase as or the reverse phase to the displacement in the driving axis direction of the vibrator. Therefore, if the displacement in the drive axis direction of the vibrator is supplied as a comparison reference signal to the first-stage amplifying circuit while it is adjusted in the same phase or in reverse phase by the adjusting circuit taking in the displacement in the driving axis direction of the vibrator, and the signal component of the extraneous vibration component is offset in the first-stage amplifying circuit of the second detection circuit. Thus, only the signal component having the same phase as the Coriolis force is detected. Accordingly, the sensor of the present invention can make re-adjustment and detect only the signal component having the same phase as the Coriolis force without requiring a trimmer nor a suction device in the adjustment work and applying no mechanical damage to the vibrator.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Preferred embodiments according to the present invention will be described hereunder with reference to the accompanying drawings.

(First Embodiment)

Figure 1:
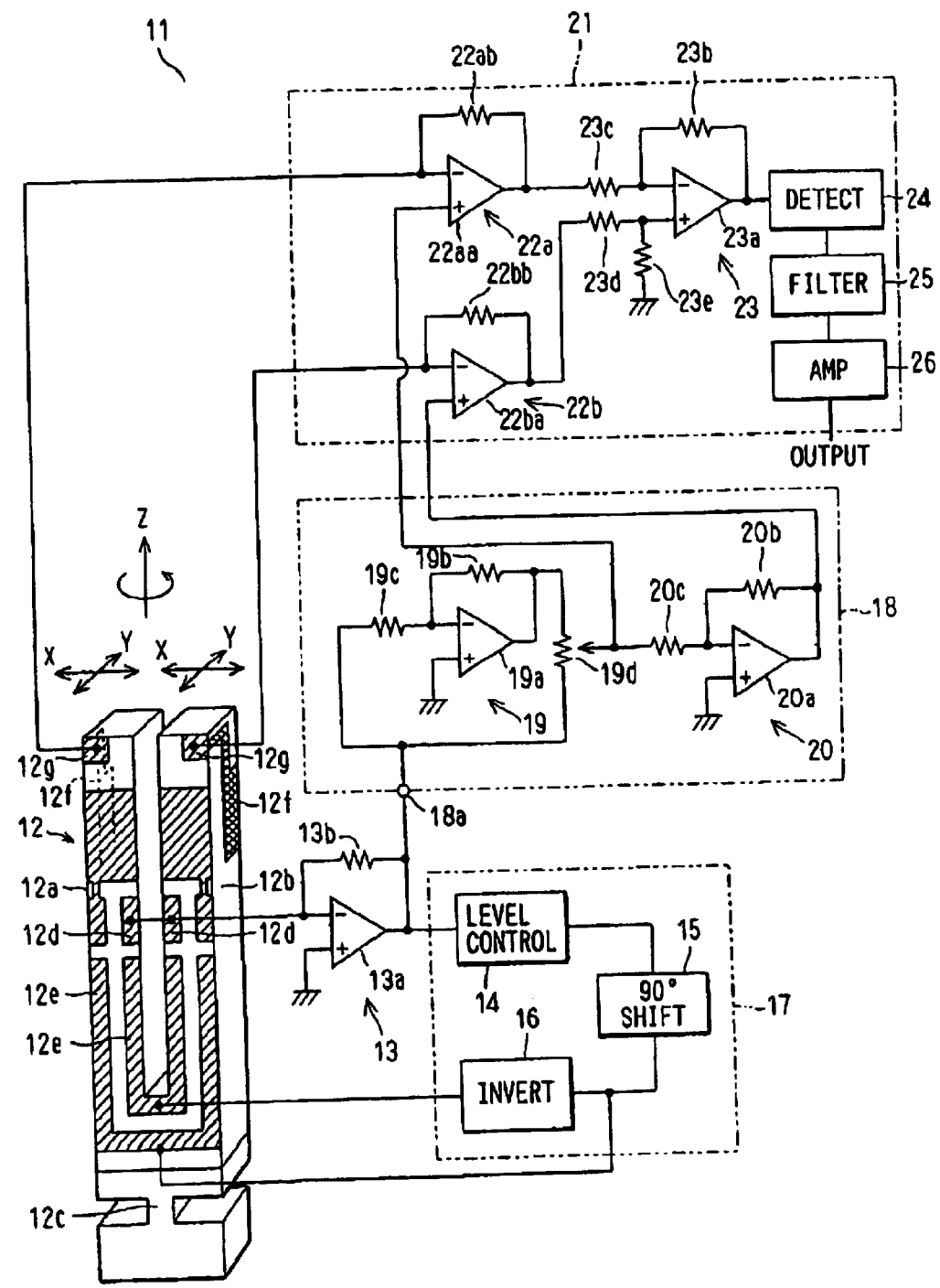
FIG. 1 is a diagram showing a vibration type angular velocity sensor according to the first embodiment of the present invention.

A vibration type angular velocity sensor 11 according to the first embodiment shown in FIG. 1 is a piezoelectric type. When the vibration type angular velocity sensor 11 is used as a yaw rate sensor, it produces an angular velocity signal when a vehicle is turned or rotated.

The vibration type angular velocity sensor 11 has a vibrator 12. The vibrator 12 comprises a piezoelectric member of PZT ceramics or the like as a main body, for example. It is designed in the form of a tuning fork so that a pair of arm portions 12a and 12b are disposed in parallel along the Z-axis so as to face each other and linked to each other at the base end portion 12c. Each of the arm portions 12a and 12b is designed to have a rectangular-column shape. A detection electrode 12d for detecting the displacement in the X-axis direction of arm portion 12a, 12b is formed at the upper portion of the surface side (front side) of each arm portion 12a, 12b, and also a driving electrode 12e for driving the arm portions 12a and 12b in the X-axis direction is formed at the lower portion of each arm portion 12a, 12b. The X, Y, Z-axes are orthogonal to one another.

Furthermore, detection electrodes 12f for detecting the displacement in the Y-axis direction are formed at the upper portions of the outer surfaces (side surface) of the arm portions 12a and 12b, and lead-out electrodes 12g are formed at the upper portions of the arm portions 12a and 12b at the front surface side. The detection electrodes 12f are connected to the lead-out electrodes 12g, respectively.

The detection electrodes 12d, the driving electrodes 12e and the lead-out electrodes 12g are wire-bonded, so that signals can be taken out and a driving AC voltage can be applied. A ground (GND) electrode is formed on the substantially whole surface of the back surface side (rear side) of the arm portions 12a and 12b to provide a reference voltage.

The detection electrodes 12d are connected to the input terminal of an amplifying circuit (first detection circuit) 13, which produces a first detection signal corresponding to a displacement of the vibrator 12. This output of the amplifying circuit 13 is supplied to an amplitude level control circuit 14 comprising an automatic gain control (AGC). The amplifying circuit 13 comprises a current(i)-to-voltage (v) amplifying circuit, in which an inverting input terminal and an output terminal of an operational amplifier 13a are connected to each other through a resistor 13b while a non-inverting input terminal of the operational amplifier 13a is connected to GND and the inverting input terminal thereof is directly connected to the detection electrodes 12d. The level control circuit 14 is an amplifying circuit for controlling the amplitude to a predetermined amplitude.

The output of the level control circuit 14 is supplied to a 90-degree phase shifting circuit 15. The output signal voltage of the 90-degree phase shifting circuit 15 and the signal voltage achieved by inverting and amplifying the output signal voltage concerned in an inverting and amplifying circuit 16 are supplied to the driving electrodes 12e so that these signal voltages are opposite in phase. The circuit corresponding to the driving circuit 17 is constructed by the level control circuit 14, the 90-degree phase shifting circuit 15 and the inverting and amplifying circuit 16 while the input/output relationship as described above is established.

Here, the vibrating operation under the stationary state when the vibrator 12 is vibrated in the X-axis direction will be schematically described.

In general, the vibrator 12 has a characteristic frequency, and the maximum amplitude of the displacement in the X-axis direction can be achieved by driving and vibrating the vibrator 12 in the X-axis direction at the resonance frequency corresponding to the characteristic frequency. At this time, under the stationary state that the maximum amplitude is achieved, the vibrational displacement is shifted in phase, that is, delayed in phase, by 90 degrees with respect to the amplitude of the applied driving voltage.

A self-excited oscillation circuit is constructed for driving the vibrator 12 at the resonance frequency at which the maximum amplitude is produced. AC driving voltages which are opposite in phase (shifted in phase by 180 degrees) are applied from the driving circuit 17 to both the driving electrode 12e formed at the inner portions of the arm portions 12a, 12b and the driving electrode 12e formed at the outer portions of the arm portions 12a, 12b. At this time, when the inner portions of the arm portions 12a and 12b of the vibrator 12 expand in the Z-axis direction, the outer portions thereof contract in the Z-axis direction. Conversely, when the inner portions contract in the Z-axis direction, the outer portions expand in the Z-axis direction, whereby the tip portions of the arm portions 12a and 12b of the vibrator 12a revibrated in the X-axis direction.

At this time, the sites of the arm portions 12a and 12b which correspond to the arrangement positions of the detecting electrodes 12d are expanded/contracted in connection with the expansion/contraction in the Z-axis direction of the sites of the arm portions 12a and 12b which correspond to the arrangement position of the driving electrodes 12e. A distortion signal is produced when the sites of the arm portions 12a and 12b (the inner portions of the arm portions) at the arrangement positions of the detecting electrodes 12d is expanded/contracted in the Z-axis direction as a time variation of the amount of charges (current) occurring in the detecting electrodes 12e through a piezoelectic effect. This distortion signal is subjected to current(i)-to-voltage(v) conversion and amplification by the amplifying circuit 13. Accordingly, the amplifying circuit 13 amplifies the distortion signal as the signal corresponding to the vibrational displacement of the arm portions 12a and 12b of the vibrator 12 in the X-axis direction.

The signal thus produced is controlled to be amplified by the level control circuit 14 so that the amplitude thereof is fixed, the above phase shift is corrected by the 90-degree phase shifting circuit 15, and this voltage is supplied to the driving electrodes 12e again. The self-excited oscillating circuit is thus constructed as a driving system. When the AC voltage is applied from the driving circuit 17 to the vibrator 12, vibration occurs at a predetermined resonance frequency in the X-axis direction corresponding to the arrangement direction of the arm portions 12a and 12b, and the vibration of the vibrator 12 in the X-axis direction is maintained.

The output of the amplifying circuit 13 is produced as a detection of the vibration, and this detection signal is supplied to the input terminal 18*a* of an adjusting circuit 18. The adjusting circuit 18 comprises a first adjusting circuit 19 at the first stage and a second adjusting circuit 20 at the second stage. The adjusting circuit 18 is used to adjust the amplitude of the detection signal in the same phase or in reverse phase. The first adjusting circuit 19 is provided at the first stage of the adjusting circuit 18, and the amplitude of the detection signal is adjusted in the same phase or in reverse phase by the electrical construction thereof. This adjusted signal is supplied to the second adjustment circuit 20 at the second stage, and also supplied to a detection circuit (second detection circuit) 21. As described later, the detection circuit 21 is provided to produce a second detection signal corresponding to the vibrational displacement in the Y-axis direction of the vibrator 12.

The first adjustment circuit 19 is designed so that the non-inverting input terminal of an operational amplifier 19*a* is connected to GND, the inverting input terminal and the output terminal of the operational amplifier 19*a* are connected to each other through a resistor 19*b* and the detection signal of the amplifying circuit 13 is supplied through the resistor 19*c* to the inverting input terminal of the operational amplifier 19*a*. Furthermore, the whole resistance component of a variable resistor 19*d* having three terminals for adjustment is interposed and connected between the output terminal of the operational amplifier 19*a* and the input terminal 18*a* of the first adjustment circuit 19 for the detection signal.

The output signal of the first adjustment circuit 19 is output from the resistance value adjusting terminal of the variable resistor 19*d*. Accordingly, the resistance value adjusting terminal of the variable resistor 19*d* is adjusted externally to adjust the resistance value thereof so that the amplitude of the detection signal of the amplifying circuit 13 can be adjusted in phase (0 degree) or in reverse phase (180 degrees).

The output signal of the first adjustment circuit 19 is supplied to the second adjustment circuit 20. The second adjustment circuit 20 comprises an operational amplifier 20*a* and resistors 20*b* and 20*c*, and an inverting and amplifying circuit for amplifying the output signal of the first adjustment circuit 19 by −1 time, for example. This output signal is supplied to the second detection circuit 21.

The second detection circuit 21 has a current(i)-to-voltage (v) converting circuits 22*a* and 22*b* at the first stage and a differential amplifying circuit 23 at the second stage. The i/v amplifying circuit 22*a* is designed so that the output signal from the output terminal of an operational amplifier 22*aa* is fed back to the non-inverting input terminal through a resistor 22*ab* and the output signal of the first adjusting circuit 19 is input as a comparison reference signal to the non-inverting input terminal of the operational amplifier 22*aa*. The non-inverting input terminal of the i/v amplifying circuit 22*aa* is directly connected to the lead-out electrode 12*g* of the arm portion 12*a*.

The i/v amplifying circuit 22*b* is designed so that the output signal of the output terminal of the operational amplifier 22*ba* is fed back to the inverting input terminal thereof through a resistor 22*bb*, and the output signal of the second adjusting circuit 20 is input as a comparison reference signal to the non-inverting input terminal of the operational amplifier 22*ba*. The inverting input terminal of the i/v amplifying circuit 22*bb* is directly electrically connected to the lead-out electrode 12*g* of the arm portion 12*b*.

The i/v amplifying circuits 22*a* and 22*b* are equipped in connection with the arm portions 12*a* and 12*b*, respectively.

Distortion signals occurring when the back surface sides (rear sides) of the arm portions 12*a* and 12*b* are expanded/contracted in the Y-axis direction are detected as time-variation of the amount of charges (current) occurring in the detecting electrodes 12*f* formed on the outer surfaces of the arm portions 12*a* and 12*b* by the i/v amplifying circuits 22*a* and 22*b*, and subjected to i/v conversion/amplification.

A differential amplifying circuit 23 is connected at the rear stage of these i/v amplifying circuit 22*a* and 22*b*. The differential amplifying circuit 23 is designed so that an operational amplifier 23*a* and resistors 23*b* to 23*e* are connected to one another to differentially amplify the output signals of the amplifying circuits 22*a* and 22*b*. The output of the differential amplifying circuit 23 is supplied to a synchronous detection circuit 24, and then detected as an angular velocity signal through a filter circuit 25 and a DC amplifying circuit 26.

The synchronous detection circuit 24 carries out the detection so as to be synchronous in phase with the Coriolis force and the in-phase signal component (reverse phase signal component), thereby producing a detection signal. The detection signal thus produced is subjected to filter processing (low pass filter processing) to produce a DC component. A DC amplifying circuit 26 amplifies the DC component to detect the angular velocity signal.

Figure 2:
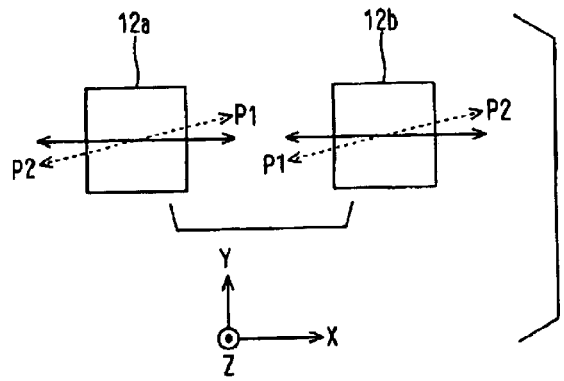
FIG. 2 is a diagram showing an extraneous vibration component.

FIG. 2 schematically shows the vibration direction of the tip portion (upper portion) side of the arm portions when the vibrator is viewed in the Z-axis direction. The driving voltages are applied from the driving circuit 17 to the driving electrodes 12*e*, and the tip portion sides of the arm portions 12*a* and 12*b* are vibrated in the X-axis direction as shown in solid line. At this time, when no extraneous vibration eliminating countermeasure is taken, extraneous vibration also occurs in the Y-axis direction even when no angular velocity Ω is applied, and thus the vibrator is vibrated in a direction shown in a dotted line. This direction is inclined with respect to the desired vibration direction (X-axis direction). The tip portion sides of the arm portions 12*a* and 12*b* are vibrated so that the maximum shift amount is achieved at P1-P1 position (inside-inside in the X-axis direction and the opposite sides in the Y-axis direction) and at P2-P2 position (outside-outside in the X-axis direction, the opposite sides in the Y-axis direction).

As described above, the extraneous vibration component occurring due to an error in mechanical dimension or the like of the vibrator 12 occurs while the vibration in the Y-axis direction is in the same phase or reverse phase with respect to the displacement of the X-axis direction. Whether the vibration occurs in the same phase or in reverse phase, that is, whether the vibration occurs in the right inclined direction or the left inclined direction in FIG. 2, is varied in accordance with a dimensional error site of the vibrator 12.

In order to eliminate this influence, this embodiment adopts the adjustment circuit 18. The amplifying circuit 13 connected to the detecting electrodes 12*d* detects current occurring in the detecting electrodes 12*d* and subjects the current to the i/v conversion/amplification. The signal voltage thus amplified is adjusted to be in the same phase or in reverse phase by the first adjusting circuit 19, and input as the comparison reference signal voltage to the non-inverting input terminal of the operational amplifier 22*aa* of the i/v amplifying circuit 22*a*.

On the other hand, in the first and the second adjusting circuit 19 and 20, the signal voltage which is i/v-converted/amplified by the amplifying circuit 13 is adjusted to a signal voltage having the reverse phase to the signal voltage input to the non-inverting input terminal of the operational amplifier 22*a*, and input as the comparison reference signal voltage to the non-inverting input terminal of the operational amplifier 22*ba*.

The i/v amplifying circuits 22*a* and 22*b* detect the current occurring in the respective detecting electrodes 12*f* and subject the detected current to the i/v conversion/amplification. Here, since the feedback resistors 22*ab* and 22*bb* are connected to the operational amplifiers 22*aa* and 22*ba*, respectively, the operational amplification operation (imaginary short-circuit) acts, and the non-inverting input terminal and the inverting input terminal are set to the same potential. Therefore, the comparison reference signal voltage input to the non-inverting input terminal is equivalently applied to the inverting input terminal.

The displacement of the extraneous vibration component in the Y-axis direction is set to have the same phase as or reverse phase to the phase of the displacement of the vibration component in the X-axis direction. Therefore, the signal voltage of the extraneous vibration component supplied from the lead-out electrodes 12*g* to the amplifying circuits 22*a* and 22*b* at the initial stage is likewise set to have the same phase as or reverse phase to the phase of the detection signal voltage which is detected and amplified by the amplifying circuit 13.

Accordingly, even in the case where the extraneous vibration component indicated by the dotted line in FIG. 2 occurs, when a user or the like adjusts the resistance value of the variable resistor 19*d* of the first adjusting circuit 19 while monitoring the output voltages of the amplifying circuits 22*a* and 22*b* so that the detection signal of the amplifying circuit 13 is adjusted to be input to the non-inverting input terminals of the operational amplifiers 22*aa* and 22*ba* in the same phase or in reverse phase, the comparison reference signal voltage input to the non-inverting input terminal is applied to the inverting input terminal because of the operational amplification operation (imaginary short-circuit) described above, so that the signal voltage of the extraneous vibration component is offset.

When an angular velocity Ω is applied around the Z-axis under the state that the above adjustment has been made, Coriolis force proportional to Ω× (the vibration velocity in the X-axis direction) acts in the Y-axis direction. Here, the vibration velocity in the X-axis direction represents a differential component of the displacement of the X-axis direction, and the Coriolis force acts as a component whose phase is shifted from the displacement in the X-axis direction by 90 degrees.

At this time, the arm portions 12*a* and 12*b* are vibrated in the opposite directions in the Y-axis direction. This vibration amount is amplified in the differential amplifying circuit 23 to achieve a Coriolis component signal. Thereafter, the synchronous detection circuit 24 carries out the detection in synchronism with the Coriolis component signal, and a DC voltage is output through the filter circuit 25 and the DC amplifying circuit 26.

It is assumed that the non-inverting input terminals of the operational amplifiers 22*aa* and 22*ba* are not connected to the adjustment circuit 18, but connected to GND, the extraneous vibration component is supplied to the synchronous detection circuit without being offset. In this case, a component signal whose phase is shifted from the Coriolis component signal by 90 degrees is amplified and then supplied to the synchronous detection circuit 24.

As described above, the synchronous detection circuit 24 carries out the detection of signals to be synchronous in phase (or reverse phase) with the Coriolis force and the signal component. In this case, if the synchronous phase is shifted, even if only slightly, the variation amount of a component whose phase is shifted from the Coriolis component signal by 90 degrees is detected after the filter output of the filter circuit 25 and the DC amplification of the DC amplifying circuit 26. This induces a problem when the angular velocity signal is produced. Therefore, according to this embodiment, the component signal whose phase is shifted from the Coriolis component signal by 90 degrees can be reduced by the circuit construction described above, so that the variation amount occurring due to the phase shift at the synchronous detection time can be suppressed as much as possible from affecting the angular velocity signal.

According to the first embodiment described above, the signal corresponding to the displacement of the arm portions 12*a* and 12*b* of the vibrator 12 which is driven in the X-axis direction by the driving circuit 17 is detected by the amplifying circuit 13, the signal corresponding to the vibrational displacement occurring in the Y-axis direction is directly detected by the amplifying circuits 22*a* and 22*b* of the second detection circuit 21. The adjusting circuit 18 adjusts the amplitude of the detection signal voltage detected by the amplifying circuit 13 in the same phase or in reverse phase, and the signal thus adjusted is input as the comparison reference signal voltage to the non-inverting input terminals of the operational amplifiers 22*aa* and 22*ba* of the amplifying circuits 22*a* and 22*b* at the first stage.

Therefore, the comparison reference signal voltage is applied to the inverting input terminal by the operational amplification operation (imaginary short-circuit) of the operational amplifiers 22*aa* and 22*ba*, so that the signal of the extraneous vibration component occurring even when no angular velocity Ω is applied around the Z-axis can be offset. Accordingly, it is unnecessary to trim the vibrator 12 with a trimmer and sucking trimmed dust with a suction device in the adjustment work. In addition, no mechanical damage is imposed on the vibrator 12, a re-adjustment work can be performed, and reliability can be enhanced.

(Second Embodiment)

Figure 3:
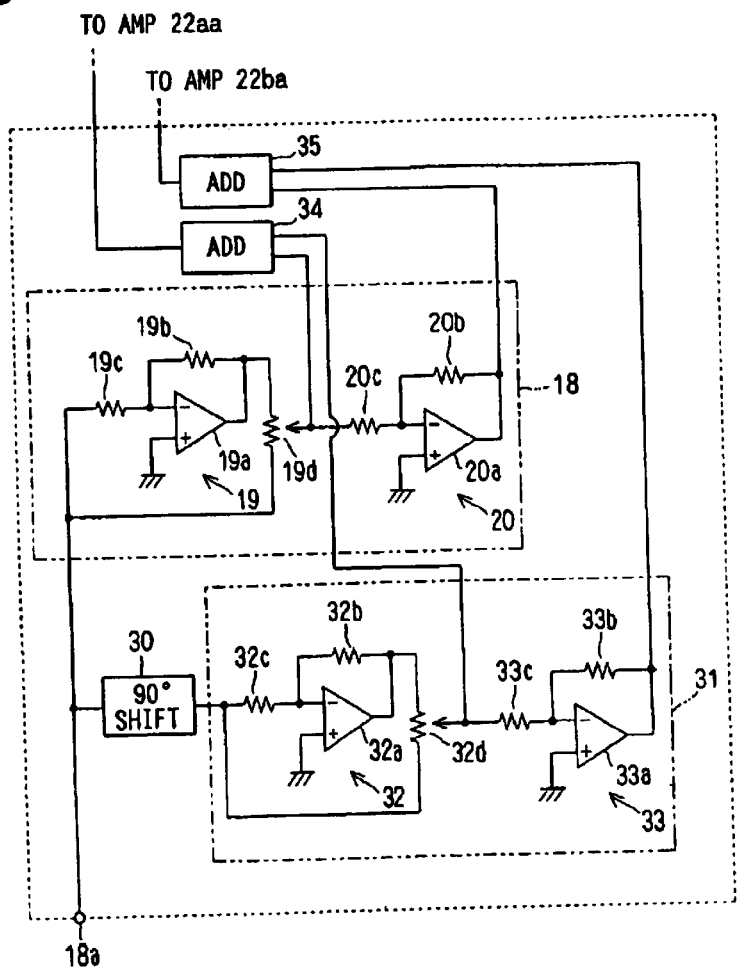
FIG. 3 is a diagram showing a part of a vibration type angular velocity sensor according to the second embodiment of the present invention.
Figure 4:
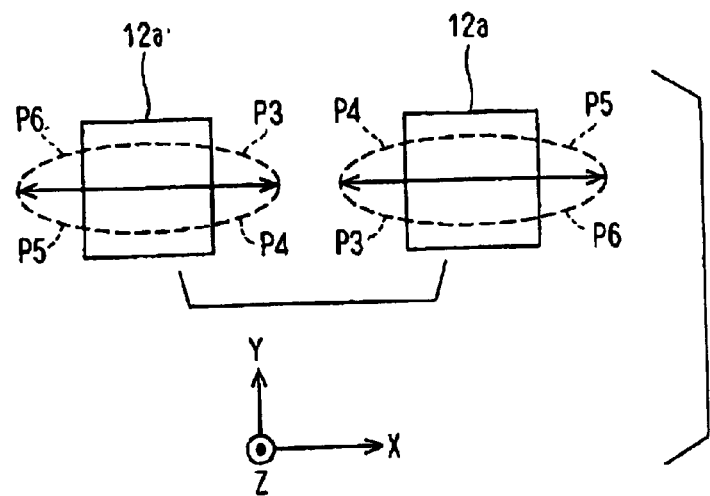
FIG. 4 is a diagram showing orthogonal extraneous vibration components.
Figure 5:
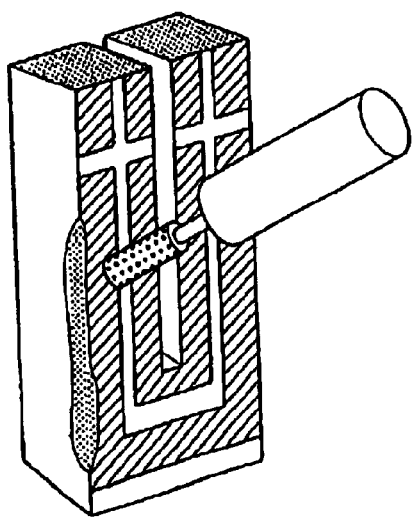
FIG. 5 is a diagram showing a prior art.

In the second embodiment shown in FIGS. 3 and 4, the same parts as the first embodiment are represented by the same reference numerals and the description thereof is omitted.

This embodiment has a circuit for avoiding an adverse effect based on an electrical factor occurring substantially in phase with (or reverse phase to) the Coriolis component signal. As described in the first embodiment, the extraneous vibration occurs in the Y-axis direction by the mechanical dimensional error of the vibrator 12 or the like. However, the component signal voltage whose phase is shifted form the Coriolis component signal by 90 degrees occurs. This effect can be corrected and avoided by supplying the signal voltage from the adjusting circuit 18 to the second detection circuit 21.

However, when the AC voltage is applied from the driving circuit 17 to the driving electrodes 12*e* of the vibrator 12, capacitive coupling occurs through the piezoelectric material of the vibrator 12, the space or the like mainly between the detecting electrodes 12*f* and the driving electrodes 12*e* for detecting the displacement in the Y-axis direction. Thus, even when no angular velocity Ω is applied around the Z-axis, an extraneous signal which is in phase with or reverse to the Coriolis component signal is generated.

In the first embodiment, the driving electrodes 12*e* are provided at the lower portion of the vibrator 12, and the detecting electrodes 12*f* are provided at the upper portions of the respective arm portions 12*a* and 12*b* to dispose both the electrode at a spatial interval, thereby avoiding the adverse effect of the capacitive coupling at the maximum. At this time, as compared with the extraneous vibration component described with reference to the first embodiment, this orthogonal extraneous vibration component is quantitatively reduced. However, even in such a case, a slight amount of orthogonal extraneous component occurs. Therefore, all the adverse effect cannot be removed. Thus, it is necessary to reduce the adverse effect caused by the electrical factor. By adopting the circuit construction shown in FIG. 3, the effect of the capacitive coupling can be removed at maximum irrespective of the location relationship between the driving electrodes 12e and the detecting electrodes 12f.

The inventors have experimentally confirmed such an effect of the coupling that there appears an orthogonal extraneous vibration component causing the tip portion side of each arm portion 12a, 12b to make a motion as if an elliptical locus (clockwise rotation or counterclockwise rotation) is drawn as shown in FIG. 4 (corresponding to the positions P3-P3, P4-P4, P5-P5, P6-P6). There is actually drawn a locus achieved by combining a linear vibration locus indicated by a dotted line of FIG. 2 and an elliptical locus indicated by a dotted line of FIG. 4 under the state that both the mechanical and electrical adverse effects described above occur.

In order to avoid this adverse effect, the circuit shown in FIG. 3 is constructed in place of the adjusting circuit 18 of the first embodiment.

Specifically, a 90-degree phase shifting circuit 30 is connected to the input terminal 18a of the adjusting circuit 18 to supply the output of the amplifying circuit 13. The 90-degree phase shifting circuit 30 shifts the phase of the signal voltage amplified in the amplifying circuit 13 by 90 degrees, and supplies the signal voltage thus phase-shifted to an offset circuit 31 connected to the subsequent stage. The off set circuit 31 comprises a first offset circuit 32 at a first stage and a second offset circuit 33 at a second stage. The first offset circuit 32 comprises an operational amplifier 32a, resistors 32b, 32c, a variable resistor 32d, etc. which are connected to one another as shown in FIG. 3, and has the same connection relationship as the first adjusting circuit 19.

In the first offset circuit 32, the amplitude of the signal voltage which is shifted in phase in the 90-degree phase shifting circuit 30 is adjusted in the same phase or in reverse phase by adjusting the resistance value of the variable resistor 32d from the external, and then supplied to the second offset circuit and an addition circuit 34.

Furthermore, the second offset circuit 33 comprises an operational amplifier 33a, resistors 33b, 33c, etc. which are connected to one another as shown in FIG. 3. The signal voltage whose amplitude is adjusted by the first offset circuit 32 is inverted by −1 time so that the phase thereof is reversed, and then supplied to the addition circuit 35.

In the first embodiment, the output signal voltage of the first adjusting circuit 19 is directly supplied to the non-inverting input terminal of the operational amplifier 22aa. However, in the second embodiment, the output signal voltage is supplied through the addition circuit 34 to the non-inverting input terminal of the operational amplifier 22aa.

Furthermore, in the first embodiment, the output signal voltage of the second adjusting circuit 20 is directly to the non-inverting input terminal of the operational amplifier 22ba. However, in the second embodiment, the output signal voltage is supplied through the addition circuit 35 to the non-inverting input terminal of the operational amplifier 22ba. The addition circuit 34 adds the signal voltage adjusted in the first adjusting circuit 19 with the signal voltage adjusted in the first offset circuit 32, and then supplies the addition result to the non-inverting input terminal of the operational amplifier 22aa.

The addition circuit 35 adds the signal voltage inverted and amplified in the second adjusting circuit 20 with the signal voltage inverted and amplified in the second offset circuit 33, and then supplies the addition result to the non-inverting input terminal of the operational amplifier 22ba.

In this case, as described above, the displacement of the orthogonal extraneous vibration component which draws an elliptical locus (clockwise rotation, counterclockwise rotation) is shifted in phase from the displacement of the vibration component in the X-axis direction by 90 degrees. Thus, the signal voltage of the orthogonal extraneous vibration component is also shifted in phase from the phase of the detection signal produced in the amplifying circuit 13 by 90 degrees.

Therefore, an operator adjusts the resistance value of the variable resistor 32d of the first offset circuit 32 from the external position while monitoring the output voltages of the amplifying circuit 22a and 22b under the state that no angular velocity is applied around the Z-axis. Thus, the detection signal voltage of the amplifying circuit 13 is adjusted to a signal voltage whose phase is shifted by 90 degrees, and then applied as a comparison reference signal voltage to the non-inverting input terminals of the operational amplifiers 22aa and 22ba through the addition circuits 34 and 35. Accordingly, the signal voltage of the orthogonal extraneous vibration component can be offset by substantially the same operation as described with reference to the first embodiment. Thus, the offset adjustment is not carried out in the DC amplifying circuit 26.

According to the second embodiment described above, in the offset circuit 31, the amplitude of the signal voltage which is phase-shifted by 90 degrees in the 90-degree phase shifting circuit 30 is adjusted in the same phase or reverse phase by the variable resistor 32d. The signal voltage adjusted from the external is added to the signal voltage adjusted in the off set circuit 33 by the adjustment circuit 18, and the signal voltage thus added is input to the non-inverting input terminals of the operational amplifiers 22aa and 22ba of the second detection circuit 21, so that the adverse effect caused by the electrical factor can be suppressed at the maximum in addition to the effect of the first embodiment.

(Other Embodiments)

The present invention is not limited to the above embodiments, and it may be modified or as follows.

The vibrator type angular velocity sensor 11 is applicable to not only a yaw rate sensor for detecting the angular velocity at which a vehicle is rotated, but also a roll rate sensor or pitch rate sensor for detecting angle of rolling.

In the above embodiments, the second detection circuit 21 has the two-stage amplifying circuits 22a, 22b, 23. However, the second detection circuit 21 may have only one-stage amplifying circuit, or three or more stages of amplifying circuits.

In the above embodiments, the adjustment is carried out by the variable resistors 19d, 32d each having three terminals. However, the adjustment may be manually carried out by using a trimmer resistor or by adjusting (trimming) the resistance value with a thin film resistor. Any mode may be adopted insofar the detection signal of the first detection circuit can be adjusted in the same phase or in reverse phase as occasion demands. Furthermore, when an adjustment value is grasped in advance, the variable resistor 19d, 32d having three terminals may be replaced by a fixed resistor having a tap which has been adjusted with a predetermined adjustment value.

In the above embodiments, the substantially whole construction of the vibrator 12 is formed of PZT ceramic piezoelectric member having a tuning-fork shape. However, the vibrator is not limited to this type of PZT ceramic piezoelectric member, and it may be formed of a metal plate to which a ceramic piezoelectric member is attached.

The first and second embodiments are applied to the piezoelectric type vibration angular velocity sensor. However, the present invention may be applied to an electrostatic capacitance type angular velocity sensor as disclosed in JP-A-5-248872. That is, a capacitance(c)-to-voltage(v) converting/amplifying circuit for converting electrostatic capacitance variation to voltage variation may be equipped at the first stage of the second detection circuit 21 in place of the i/v converting/amplifying circuit 22a, etc. of the first and second embodiments.

In this case, at least a pair of arm portions are arranged in a comb-tooth shape, and at least pair of detecting arm portions which are disposed perpendicularly to the pair of arm portions are equipped in the detection axis direction perpendicular to the driving axis direction along which the pair of arm portions are vibrated in the driving axis direction upon application of an AC voltage from the driving circuit. The c/v converting/amplifying circuit detects the variation of the electrostatic capacitance occurring between the pair of detecting arm portions as the signal corresponding to the vibrational displacement occurring in the detection axis direction (the vibration direction of the detecting arm portions).

At this time, the extraneous vibration component can be offset like the above embodiments by inputting the output signal of the adjusting circuit 18 or the circuit shown in FIG. 3 as a comparison reference signal for the signal input to the c/v converting/amplifying circuit. In short, any type of angular velocity sensor may be applicable insofar as the vibrator is vibrated in the driving axis direction upon application of an AC signal from the driving circuit to the vibrator and the signal corresponding to the displacement of the vibrator occurring in the detection axis direction perpendicular to the driving axis direction is detected to detect the angular velocity. Furthermore, any type of angular velocity sensor may be applied insofar as a pair of arm portions are disposed so as to face each other.

In the second embodiment, the 90-degree phase shifting circuit 30 is provided to perform the adjustment, however, it may be equipped as occasion demands. That is, the second embodiment may be modified so that if a signal is in the same phase or reverse phase with the Coriolis force, the amplitude is adjusted by using the signal concerned in the offset circuit 31 and then supplied as a comparison reference signal through the adding circuits 34 and 35 to the second detection circuit 21. An extraneous signal of the same phase as or reverse phase to Coriolis force is induced by the capacitive coupling between an AC signal applied from the driving circuit 17 to the vibrator 12, and thus it is desirable that the offset circuit 31 is designed so that the amplitude of the AC signal applied from the driving circuit 17 to the vibrator 12 is adjusted in the same phase or reverse phase.

In this case, the effect of the capacitive coupling from the applied AC voltage can be removed optimally. In short, any mode can be adopted insofar as the signal achieved by adjusting the 90-degree phase-shifted signal voltage in the same phase or reverse phase is input as the comparison reference signal of the amplifying circuit at the first stage.

What is claimed is:

1. A vibration type angular velocity sensor comprising:
    a vibrator for vibrating in a driving axis direction upon application of an AC voltage thereto;
    a driving circuit for applying the AC voltage to the vibrator;
    a first detection circuit for producing a first signal corresponding to a displacement of the vibrator, which occurs in the driving axis direction in response to the AC voltage;
    a second detection circuit for producing a second signal corresponding to a displacement of the vibrator, the displacement occurring in a detection axis direction perpendicular to the driving axis direction; and
    an adjusting circuit for adjusting an amplitude of the first signal of the first detection circuit in the same phase or reverse phase,
    wherein the adjusting circuit applies the adjusted first signal to a first stage circuit part of the second detection circuit as a comparison reference signal of the second detection circuit.

2. The vibration type angular velocity sensor according to claim 1, wherein:
    the vibrator includes at least a pair of arm portions disposed to face each other;
    the adjusting circuit includes at least a pair of adjusting circuits each producing the comparison reference signal in opposite phases;
    the second detection circuit includes a plurality of amplifying circuits respectively provided as the first stage circuit part in connection with the pair of arm portions; and
    the amplifying circuits of the second detection circuit are connected directly to detection electrodes of the arm portions supplied with the comparison reference signals which are adjusted to be reversed to each other by the adjusting circuit.

3. The vibration type angular velocity sensor according to claim 2, further comprising:
    an offset circuit for adjusting the amplitude of a 90-degree phase-shifted first signal of the first detection circuit in the same phase or reverse phase; and
    addition circuits to apply the comparison reference signals to the amplifying circuits of the second detection circuit by adding the adjusted first signals and adjusted phase-shifted first signals.

4. The vibration type angular velocity sensor according to claim 3, wherein the offset circuit adjusts, in the same phase or reverse phase, the amplitude of the AC signal to be applied from the driving circuit to the vibrator.

5. The vibration type angular velocity sensor according to claim 1, wherein the adjusting circuit includes a variable resistor for variably adjusting the comparison reference signal.

6. The vibration type angular velocity sensor according to claim 2, wherein the second detection circuit further includes a differential circuit connected to outputs of the amplifying circuits and a filter circuit connected to the differential circuit.

7. A vibration type angular velocity sensor comprising:
    a vibrator means for vibrating in a driving axis direction upon application of an AC voltage thereto;
    a driving circuit means for applying the AC voltage to the vibrator means
    a first detection circuit means for producing a first signal corresponding to a displacement of the vibrator means, which occurs in the driving axis direction in response to the AC voltage;

a second detection circuit means for producing a second signal corresponding to a displacement of the vibrator means, the displacement occurring in a detection axis direction perpendicular to the driving axis direction; and an adjusting circuit means for adjusting an amplitude of the first signal of the first detection circuit means in the same phase or reverse phase, wherein the adjusting circuit means applies the adjusted first signal to a first stage circuit part of the second detection circuit means as a comparison reference signal of the second detection circuit means.

8. The vibration type angular velocity sensor according to claim 7, wherein:

the vibrator means includes at least a pair of arm portions disposed to face each other;

the adjusting circuit means includes at least a pair of adjusting circuits each producing the comparison reference signal in opposite phases;

the second detection circuit means includes a plurality of amplifying circuits respectively provided as the first stage circuit part in connection with the pair of arm portions; and the amplifying circuits of the second detection circuit means are connected directly to detection electrodes of the arm portions supplied with the comparison reference signals which are adjusted to be reversed to each other by the adjusting circuit means.

9. The vibration type angular velocity sensor according to claim 8, further comprising:

an offset circuit means for adjusting the amplitude of a 90-degree phase-shifted first signal of the first detection circuit means in the same phase or reverse phase; and addition circuits to apply the comparison reference signals to the amplifying circuits of the second detection circuit means by adding the adjusted first signals and adjusted phase-shifted first signals.

10. The vibration type angular velocity sensor according to claim 9, wherein the offset circuit means adjusts, in the same phase or reverse phase, the amplitude of the AC signal to be applied from the driving circuit means to the vibrator.

11. The vibration type angular velocity sensor according to claim 7, wherein the adjusting circuit means includes a variable resistor for variably adjusting the comparison reference signal.

12. The vibration type angular velocity sensor according to claim 8, wherein the second detection circuit means further includes a differential circuit connected to outputs of the amplifying circuits and a filter circuit connected to the differential circuit.

* * * * *